United States Patent
Radhakrishnan et al.

(10) Patent No.: US 9,538,468 B2
(45) Date of Patent: Jan. 3, 2017

(54) POWER SAVING IN WI-FI DEVICES UTILIZING BLUETOOTH

(71) Applicant: Meru Networks, Sunnyvale, CA (US)

(72) Inventors: Suryanarayanan Radhakrishnan, Fremont, CA (US); Saurabh Bhargava, San Jose, CA (US); Sanjay Gandotra, Santa Clara, CA (US)

(73) Assignee: Fortinet, Inc., Sunnyvale, CA (US)

( * ) Notice: Subject to any disclaimer, the term of this patent is extended or adjusted under 35 U.S.C. 154(b) by 18 days.

(21) Appl. No.: 14/581,344

(22) Filed: Dec. 23, 2014

(65) Prior Publication Data
US 2016/0183185 A1    Jun. 23, 2016

(51) Int. Cl.
*H04W 52/02* (2009.01)
*H04W 4/00* (2009.01)
*H04W 68/00* (2009.01)
*H04W 88/06* (2009.01)
*H04W 40/00* (2009.01)

(52) U.S. Cl.
CPC ......... *H04W 52/0209* (2013.01); *H04W 4/008* (2013.01); *H04W 68/005* (2013.01); *H04W 40/005* (2013.01); *H04W 88/06* (2013.01)

(58) Field of Classification Search
CPC ............. H04W 52/0209; H04W 4/008; H04W 68/005; H04W 88/06; H04W 40/005; H04W 24/00; H04W 52/0225; H04W 2/51
See application file for complete search history.

(56) References Cited

U.S. PATENT DOCUMENTS

| | | | | |
|---|---|---|---|---|
| 8,086,213 B1* | 12/2011 | Wong | ................ | H04W 52/0206 455/334 |
| 9,326,310 B2* | 4/2016 | Zhang | .................... | H04W 16/14 |
| 2002/0022455 A1* | 2/2002 | Salokannel | ........... | H04W 52/28 455/68 |
| 2009/0054009 A1* | 2/2009 | Yang | ...................... | H04W 16/14 455/78 |
| 2009/0137206 A1* | 5/2009 | Sherman | ............... | H04W 16/14 455/41.2 |
| 2009/0213773 A1* | 8/2009 | Yoon | ................. | H04W 52/0212 370/311 |
| 2009/0319663 A1* | 12/2009 | Giles | ..................... | H04W 8/183 709/226 |
| 2013/0225215 A1* | 8/2013 | Kolde | ............... | H04W 52/0209 455/466 |
| 2014/0153460 A1* | 6/2014 | Shrivastava | ...... | H04W 52/0225 370/311 |

(Continued)

Primary Examiner — Warner Wong
(74) Attorney, Agent, or Firm — Law Office of Dorian Cartwright

(57) ABSTRACT

The present description provides methods, computer program products, and systems for saving power in Wi-Fi devices utilizing Bluetooth. A Wi-Fi radio transitions to deep sleep mode from active mode while a Bluetooth radio remains active. An active Wi-Fi connection to the access point can be maintained by the station while in deep sleep mode as needed to prevent being disassociated. Responsive to the indication of data packets waiting at the access point, sent over the Bluetooth radio, the Wi-Fi radio at the station can be transitioned from the deep sleep mode to the active mode. A notification of active mode is sent to the access point currently associated with the Wi-Fi radio so that packets can be forwarded.

18 Claims, 6 Drawing Sheets

(56) References Cited

U.S. PATENT DOCUMENTS

| | | | |
|---|---|---|---|
| 2015/0103708 A1* | 4/2015 | Kang | H04W 76/023 |
| | | | 370/311 |
| 2016/0081009 A1* | 3/2016 | Tailor | H04W 48/16 |
| | | | 455/432.1 |
| 2016/0127989 A1* | 5/2016 | Zhang | H04W 52/0203 |
| | | | 726/7 |

* cited by examiner

POWER SAVING IN WI-FI DEVICES UTILIZING BLUETOOTH

FIELD OF THE INVENTION

The invention relates generally to computer networking, and more specifically, to saving power in Wi-Fi devices utilizing Bluetooth.

BACKGROUND

Today mobile computerized devices (e.g., smart phones, laptops, and tablets) are surpassing stationary computerized devices for user access to the Internet and other networks. One of the main limitations of untethering from cords is battery-life. Consumers also seek to reduce unnecessary power usage of corded devices as well. An additional stain is that as network usage becomes more pervasive and mobile processing functionalities increase, more power is needed.

Conventional sleep modes turn off most components of a mobile device in order to preserve battery life. Sleep modes typically allow a device to restart without all of steps needed after a complete power down for quicker access to the device.

Problematically, sleep modes cause a device to lose connectivity with network resources. For example, maintenance of a Wi-Fi connection requires periodic synching between the device and an access point use for connecting to the Internet and other networks. As a result, resuming network activity after sleep mode can take an additional period of time after the device wakes up.

Another problem with putting a device into sleep mode is that intervening messages sent to the device are missed. For example, the Wi-Fi radio is turned off, so Wi-Fi messages sent from chat sessions, e-mail updates or other asynchronous communications are put on hold. Once the device wakes up from sleep mode, and restores a network connection, even more time is needed retrieve updates and some are completely lost.

Therefore, what is needed is a technique that saves power in Wi-Fi devices utilizing Bluetooth, or other low-power communication channels.

SUMMARY

The aforementioned shortcomings are addressed by methods, computer readable media (non-transitory), and devices for saving power in Wi-Fi devices utilizing Bluetooth.

In one embodiment, a notification of deep sleep mode is sent from a station to an access point currently associated with the Wi-Fi radio. The Wi-Fi radio at the station transitions to deep sleep mode from active mode while a Bluetooth radio remains active. An Wi-Fi connection to the access point can be maintained by the station while in deep sleep mode as needed to prevent being disassociated. For example, an active association between a station and an access point can be maintained as active in an internal data structure, a very low power operation relative to actively maintaining a connection. The active state can be subsequently restored by loading active state information from the internal data structure.

In some embodiments an indication is received over the Bluetooth radio, of data packets destined to the Wi-Fi radio waiting in a packet queue of the access point. Responsive to the indication of data packets, the Wi-Fi radio can be transitioned from the deep sleep mode to the active mode, although in some embodiments, a transition is depending upon further conditions (e.g., after a certain period of time, or only if a certain priority level of packets are waiting). A notification of active mode is sent to the access point currently associated with the Wi-Fi radio so that packets can be forwarded.

Advantageously, Wi-Fi devices save power by entering deep sleep mode while maintaining a Wi-Fi connection and without missing important communications, utilizing a much lower power Bluetooth connection.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

I. Summary of Disclosure

The shortcomings of the prior art are addressed by methods, (non-transitory) computer program products, and systems for saving power in Wi-Fi devices utilizing Bluetooth, as described herein. In deep sleep mode, various configurations can be implemented. In one embodiment, the Wi-Fi functionality is turned off while the station 110 remains active. In another embodiment, the station 110 is mostly turned off and Bluetooth functionality remains active. Alternatively, the Bluetooth functionality can have its own active/sleep mode. In other embodiments, various degrees of the combination of functionality are possible to save power. Deep sleep mode can also be referred to as sleep, stand by, power saving mode, or the like.

Generally, one of ordinary skill in the art will recognize that the examples set forth herein are non-limiting and only illustrative of widely-applicable principles. For example, Although Wi-Fi and Bluetooth are described herein as primary and alternative networks, respectively, other combinations of wireless protocols are implementable. Furthermore, virtual port services and SDN (software-defined networking) services can optionally be used in combination with packets destined for power saving devices for additional features.

II. System Save Power in a Wi-Fi Device Utilizing Bluetooth (FIGS. 1-3)

Figure 1:
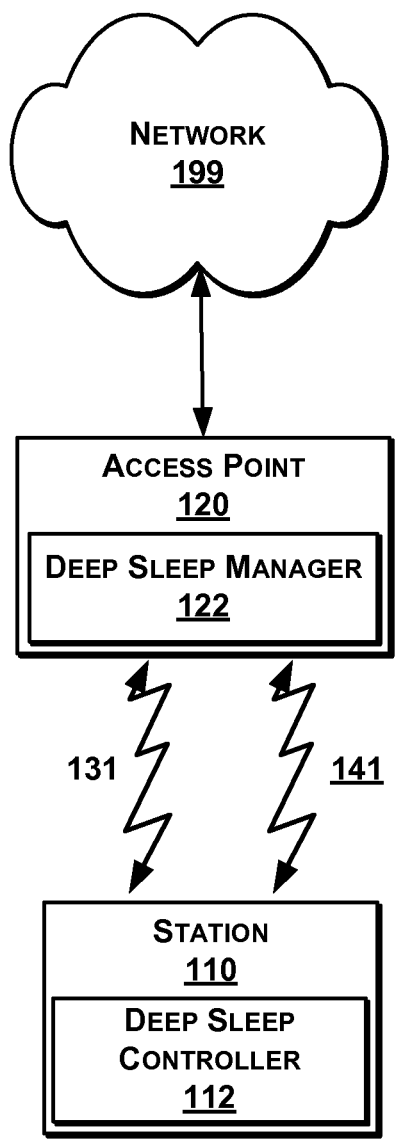
FIG. 1 is a high-level block diagram illustrating a system to save power in a Wi-Fi device utilizing Bluetooth, according to one embodiment.

FIG. 1 is a high-level block diagram illustrating a system to save power in a Wi-Fi device utilizing Bluetooth, according to one embodiment. The system 100 includes a station 110 and an access point 120, coupled to a network 199 (e.g., a LAN, WAN, the Internet, a cloud-based network, a data network, a cellular network, a hybrid network, or the like). The system 100 is merely an example of many possible configurations which could include more access points, a controller, additional stations, routers, switches, firewalls, and the like. In other embodiments, a seamless mobility service running on the system 100 provides a uniquely-assigned and persistent BSSID (blind service set identifier) permitting the station 100 to move from one access point to another without reconfiguration. In other embodiments, an SDN controller uses OpenFlow rules to centralize how data packets destined for a station in deep sleep are handled on a data plane of the system 100.

The station 110 and the access point 120 are coupled in communication primarily through a Wi-Fi channel 131. The components are also coupled in communication through a Bluetooth channel 141. In some embodiments, the Bluetooth channel 141 includes repeaters. Positioning of the repeaters helps match Bluetooth coverage range to the Wi-Fi coverage range, due to the inherent line-of-sight limitation of Bluetooth which hiders the coverage range.

The station 110 includes a deep sleep controller 112 to transition into a deep sleep mode from an active mode responsive to certain conditions. For example, if no packets or a low number of packets is received over a period, the station 110 may be wasting power to maintain an active connection in a full power connection. Initially, the deep sleep controller 112 registers Bluetooth communication information (e.g., a destination address) with the access point 120, as being associated with the station 110. In an embodiment, the station sends a notification to the access point 120 of going into deep sleep to prevent the access point from disassociating an active connection (using either Wi-Fi or Bluetooth). In deep sleep mode, various configurations can be implemented. In one embodiment, the Wi-Fi functionality is turned off while the station 110 remains active. In another embodiment, the station 110 is mostly turned off and Bluetooth functionality remains active. There can be more than one degree of deep sleep mode. Alternatively, the Bluetooth functionality can have its own active/deep sleep modes. In other embodiments, various degrees of the combination of functionality are possible to save power.

The deep sleep controller 112, from time to time, sends a minimal amount of necessary data to maintain an active connection with the access point 120. For example, the deep sleep controller 112 can cause the station 110 to wake up in order to send a data packet over a Wi-Fi channel. In another example, the data packet is sent over a Bluetooth channel without waking up the station 110. In still another embodiment, the data packet is sent while the station 110 remains in deep sleep mode. A specific protocol can govern how often and what kind of packets are necessary to maintain the Wi-Fi connection. As a result of maintaining the active connection, data packet continue to be forwarded to the access point 120 in order to reach the station 110 as a final destination.

The deep sleep controller 112 receives a notification of awaiting packets over the Bluetooth channel from the access point 120, in an embodiment. The notification can be sent immediately and each time, after a certain amount of accumulation, or periodically. Further, an optional embodiment uses priority indications so that the deep sleep controller 112 can take more immediate action if needed. In response, the station 110 transitions back to the active mode from the deep sleep mode. The station 110 then transmits a notification to the access point 120 which returns awaiting data packets. Alternatively, certain data packet, such as those with low data rates or a low overall amount of data, can be transferred directly over the Bluetooth connection without awaking station 110. Another option is to check for waiting packets during temporary wake-ups to maintain the Wi-Fi connection.

The station 110 can be, for example, a personal computer, a laptop computer, a tablet computer, a smart phone, a mobile computing device, an Internet appliance, a non-wireless device modified to have wireless capabilities, or any other computing device, mobile or stationary. The deep sleep controller 112 comprises hardware, software, or a combination of both. The deep sleep controller 112 can be an application (e.g., a daemon or mobile app) or be part of an operating system. Configurations can be set programmatically by applications, or manually through a user interface or user-configured policy. The station 110 is wirelessly coupled to the access point 120 and assigned a BSSID, generally, as a gateway for network communications on a wired backbone or other wireless stations of the system 100.

The station 110 is set forth in further detail below with respect to FIG. 2A.

The access point 120 includes a deep sleep manager 122 to track modes of many stations along with the station 110. A look-up table or database can store identifications of stations 110 (e.g., MAC addresses) along with a current state of each station and alternative communication channels (e.g., Bluetooth addresses). When notifications are received from the station, the current station may be updated. In one embodiment, if a maintenance notification is not received after a certain period, the active connection can be disassociated. Based on the state of a station, the access point 120 stores packets until awakened, or forwards the packets immediately when currently awake.

The access point 120 can be a single access point, one of several access points operated by an entity (e.g., a store, a building, or a cloud-service). For example, the access point 120 can be an AP 110 or AP 433 (modified as discussed herein) by Meru Networks of Sunnyvale, Calif. The deep sleep manager 122 comprises hardware, software, or a combination of both. Configurations can be set programmatically by applications, or manually through a user interface. Each access point 120 is preferably connected to the network 199 (e.g., gateway, switch, router, hub, or another access point that is connected to the network 199) via a wired connection, but in some embodiments, such as a mesh network, the uplink connection is wireless. The access point 120 can be set-up in various configurations to provide wireless coverage areas. The access point uses beacons to advertise one or more BSSIDs and to stay synched with connected stations. In another embodiment, the functionality is incorporated into a switch or router.

More detail about the access point 120 is discussed below with respect to FIG. 2B.

Figures 2A, 2B:
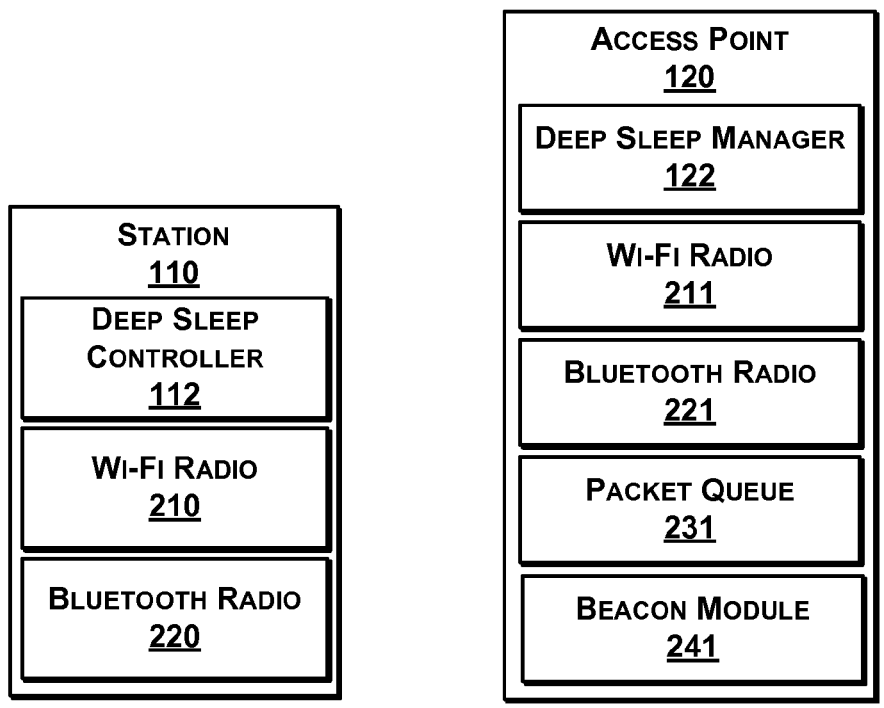
FIG. 2A is a more detailed block diagram illustrating a station of the system of FIG. 1, according to one embodiment.
FIG. 2B is a more detailed block diagram illustrating an access point of the system of FIG. 1, according to one embodiment.
Figure 3:
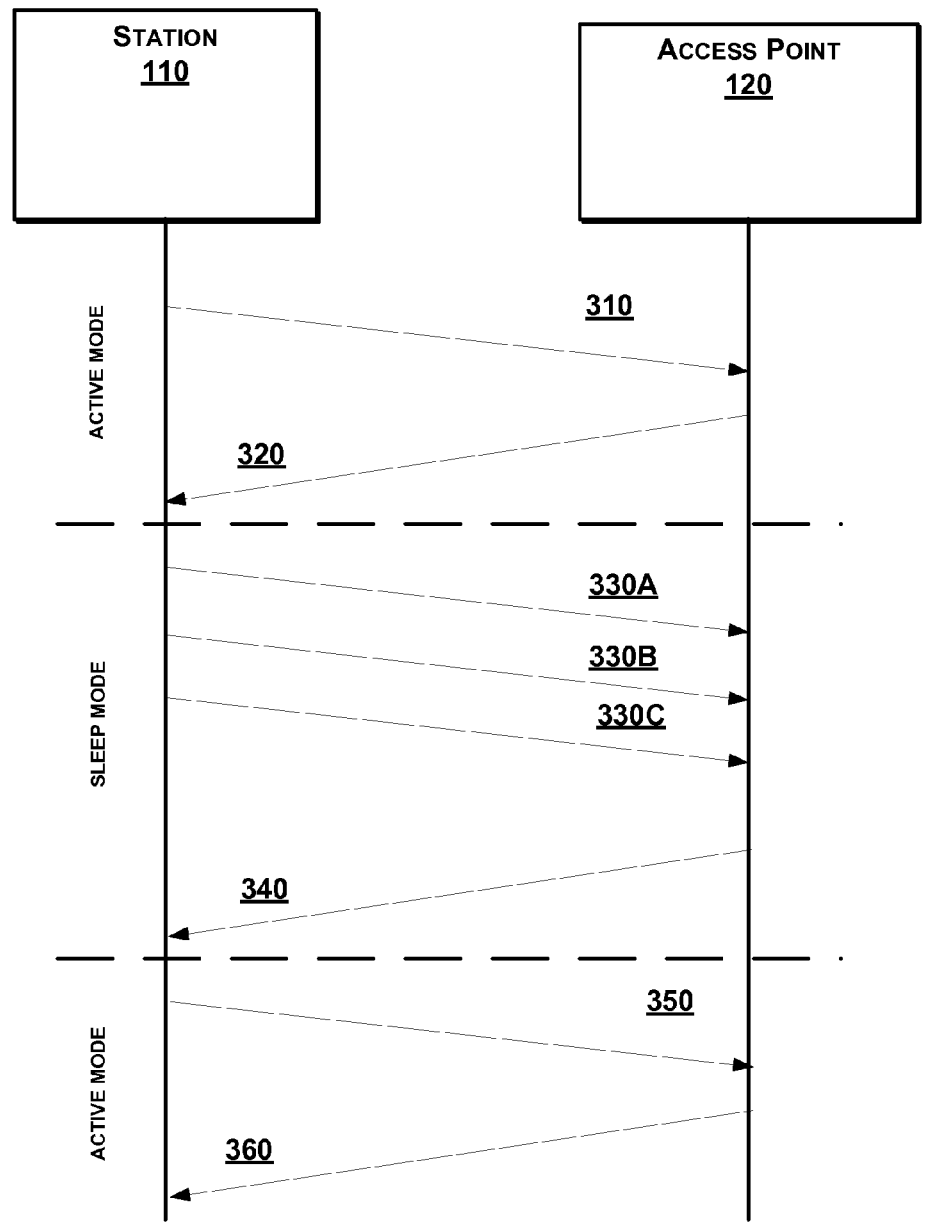
FIG. 3 is an interaction diagram illustrating communications between components of the system of FIG. 1, according to one embodiment.

FIG. 2A is a more detailed block diagram illustrating the station 110 of the system of FIG. 1, according to one embodiment. The station 110 further includes the deep sleep controller 112, a Wi-Fi radio 210 and a Bluetooth radio 220. In some embodiments, different combinations of protocols, or more than two protocols, can be implemented. The deep sleep controller 112 bridges communications refers to rules from a policy or configurations to manage which communication channel packets are sent from and to react to commands received within packets on one channel (i.e., using the Wi-Fi radio 120 or the Bluetooth radio 220).

The Wi-Fi radio 120 conforms to IEEE 802.11 standards, such as a, g, n, ac, and the like. The Wi-Fi radio 120 operates at a physical layer utilizing a transceiver and antennae to transmit and receive packets on a wireless channel using electromagnetic principles. The Wi-Fi radio 120 operates in conjunction with higher layer software of the OSI stack that passes down information from upper layer applications. The deep sleep controller 112 can insert packets from various layers, based on a particular implementation. The Wi-Fi radio 120 can be implemented on directly on a motherboard, on an internally attachable Wi-Fi card, or an externally attachable USB connection, for example.

The Bluetooth radio 220 conforms to Bluetooth standards such as BLE (Bluetooth Low Energy), or v1, v2 or v3. The Bluetooth radio 220 also uses a transceiver and antennae to transmit on a wireless channel using electromagnetic principles, albeit at different frequencies and using different symbols, relative to the Wi-Fi radio 210. The deep sleep controller 112 can also send packets to the Bluetooth radio 220, depending on a current mode. In some embodiments, the Bluetooth radio 220 remains available for other applications besides the deep sleep controller 112, and my temporarily disrupt other connections when needed, or accommodate multiple communication channels.

FIG. 2B is a more detailed block diagram illustrating the access point 120 of the system of FIG. 1, according to one embodiment. The access point 120 comprises the deep sleep manager 122 along with a Wi-Fi radio 311, a Bluetooth radio 321, a packet queue 331 and a beacon module 341. The deep sleep manager 122 uses rules from a policy or configurations to handle communications sent to and received from the Wi-Fi radio 211 and the Bluetooth radio 221. Further, the deep sleep manager 122 can generate commands sent to the deep sleep controller 112.

The Wi-Fi radio 211 and the Bluetooth radio 221 can be similar to, and compatible with, the Wi-Fi radio 211 and the Bluetooth radio 221 of the station 110. However, Bluetooth radio 221 can be modified to handle multiple connections by actively tearing down connections to remain available, by using a version that accommodates multiple connections, or by implementing multiple radios, for example.

The packet queue 231 can be any type of appropriate computer storage, including a cache, a processor memory, a RAM memory device, or a drive storage device. In some embodiments, the packet queue 231 can store packets for stations in deep sleep mode, separate from other packets, so that different rules and handling can be applied.

The beacon module 241 can be an application that periodically generates beacons sent out to advertise BSSIDs and to synchronize connected stations. The beacon module 241 can share access to the Wi-Fi radio 211 along with the deep sleep manager 122. In some embodiments, communications regarding deep sleep modes is distributed within beacons. For example, one or more fields can indicate whether or not packets are waiting in the packet queue 231 for a particular MAC, or for a particular BSSID in the case of uniquely-assigned BSSID of the virtual port service.

FIG. 3 is an interaction diagram illustrating communications between components of the system of FIG. 1, according to one embodiment.

While in an active mode, the station 110 sends a notification of deep sleep mode using either Wi-Fi or Bluetooth to the access point 120 (interaction 310). When using Wi-Fi to send the notification, packets use a MAC address of the station 110 as a source address and a BSSID for the access point 120 as a destination address. The access point 120 responds with an acknowledgment over either Wi-Fi or Bluetooth to the station 110 (interaction 320).

While in a sleep mode, the station 110 periodically sends required information to the access point 120 in order to maintain a connection utilizing either Wi-Fi or Bluetooth channels (interactions 330A-C). When using Bluetooth to send the information, the packets use the Bluetooth radio of the station 110 as a source address and a Bluetooth radio of the access point 120 as a destination address. Eventually, the access point 120 sends a notification to the station 110 that packets are waiting in a queue for the station 110 (interaction 340).

Once again in active mode, the station 110 sends a notification to the access point 120 that packets can be sent (interaction 350). In response, the access point 120 sends waiting packets to the station 110 using Wi-Fi (interaction 360). When using Wi-Fi to send the queued packets, the BSSID of the access point 120 is used as the source address and the MAC address of the station 110 is used as the destination address.

III. Methods for Power Saving in a Wi-Fi Device Utilizing Bluetooth (FIGS. 4-5)

Figure 4:
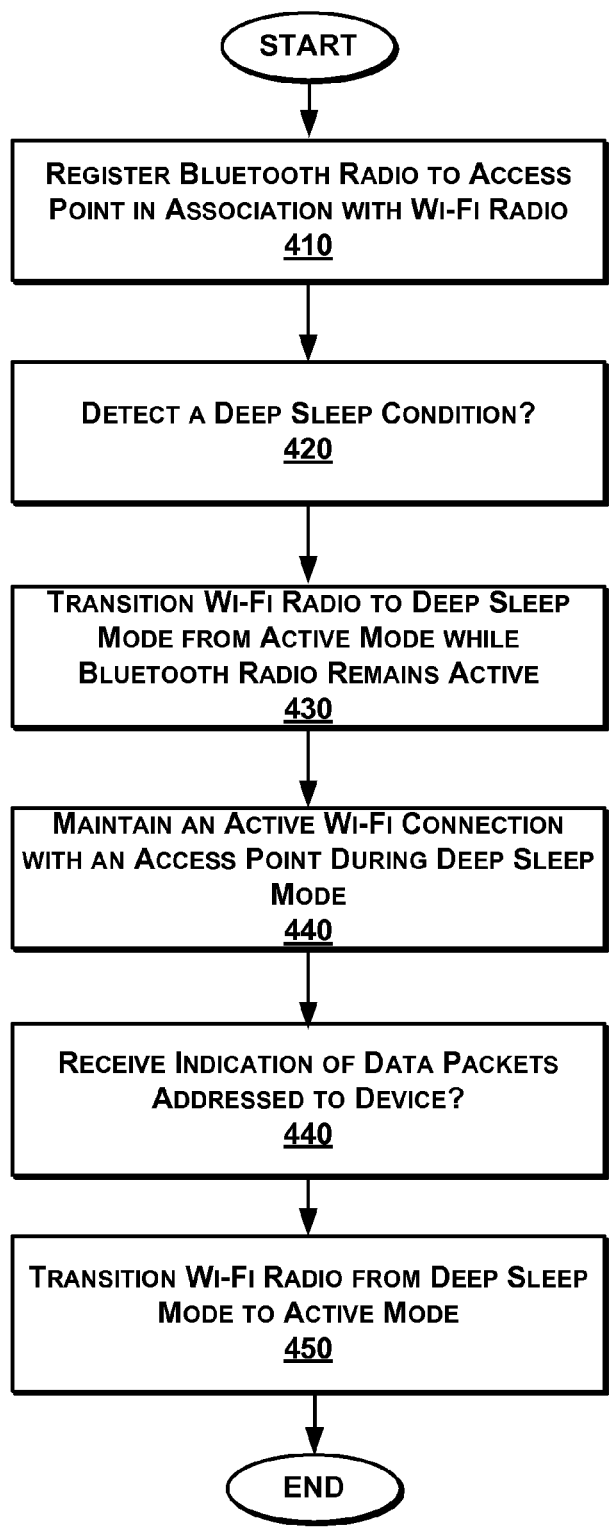
FIG. 4 is a high-level flow diagram illustrating a method, in a station, for saving power in a Wi-Fi device utilizing Bluetooth, according to one embodiment.

FIG. 4 is a high-level flow diagram illustrating a method 400, in a station, for saving power in a Wi-Fi device utilizing Bluetooth, according to one embodiment. The method 400 can be implemented, for example, in the system 100 and those of ordinary skill in the art will recognize other systems for implementation.

A Bluetooth radio of a station is registered with an access point in association with a Wi-Fi radio (step 410). A Wi-Fi radio transitions to deep sleep mode from active mode while a Bluetooth radio remains active (step 420). The transition in includes sending an indication from the device to an access point, and in some embodiment, awaiting a response from the access mode until entering the deep sleep mode. An active Wi-Fi connection is maintained with an access point during the deep sleep mode (step 430). In one case, the Wi-Fi radio sends necessary packets from time to time either while remaining in deep sleep mode or while temporarily waking up. In other embodiments, the Bluetooth radio maintains the Wi-Fi connection. If an indication of data packets addressed to the device are received (step 440), the Wi-Fi radio is transitioned from deep sleep mode back to active mode (step 450). The indications can be received while the Wi-Fi device is temporarily awake, or can be sent through the Bluetooth channel.

Figure 5:
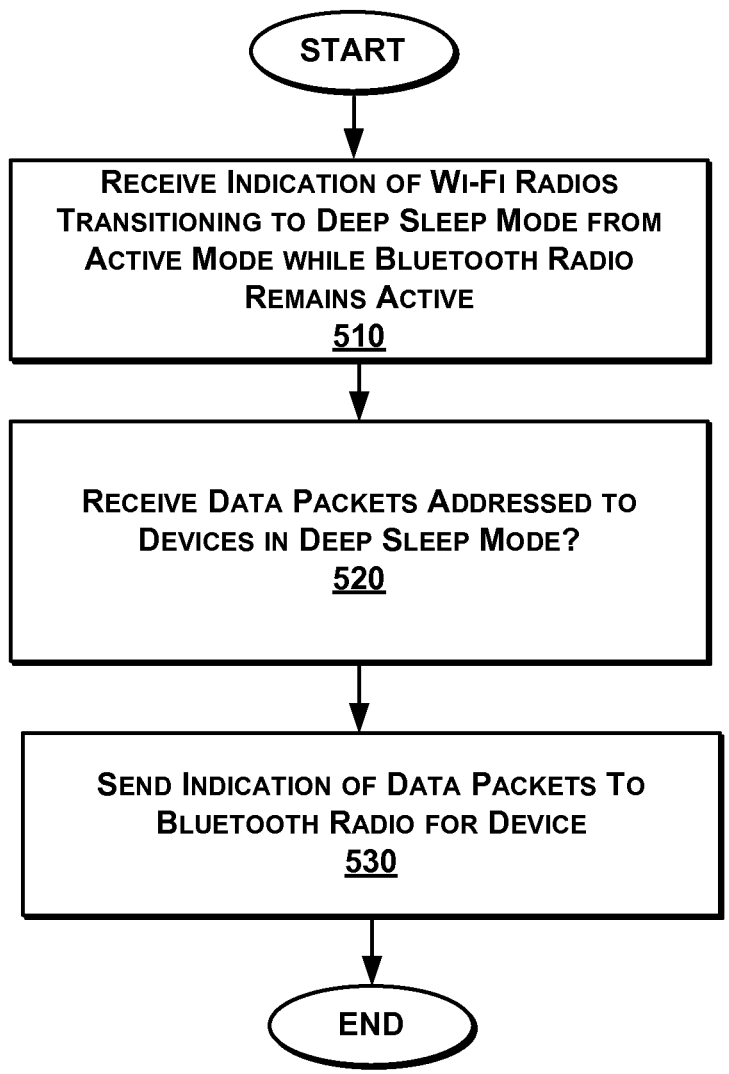
FIG. 5 is a high-level flow diagram illustrating a method, in an access point, for communication with Wi-Fi devices that are power saving utilizing Bluetooth, according to one embodiment.

FIG. 5 is a high-level flow diagram illustrating a method 500, in an access point, for communication with Wi-Fi devices that are power saving utilizing Bluetooth, according to one embodiment. An indication of Wi-Fi radios transitioning to deep sleep mode from an active ode while a Bluetooth radio remains active is received (step 510). Data packets addressed to devices in deep sleep mode (step 520), an indication of data packets is sent to the Bluetooth radio for the devices is sent (step 530).

III. General Computing Devices (FIG. 6)

Figure 6:
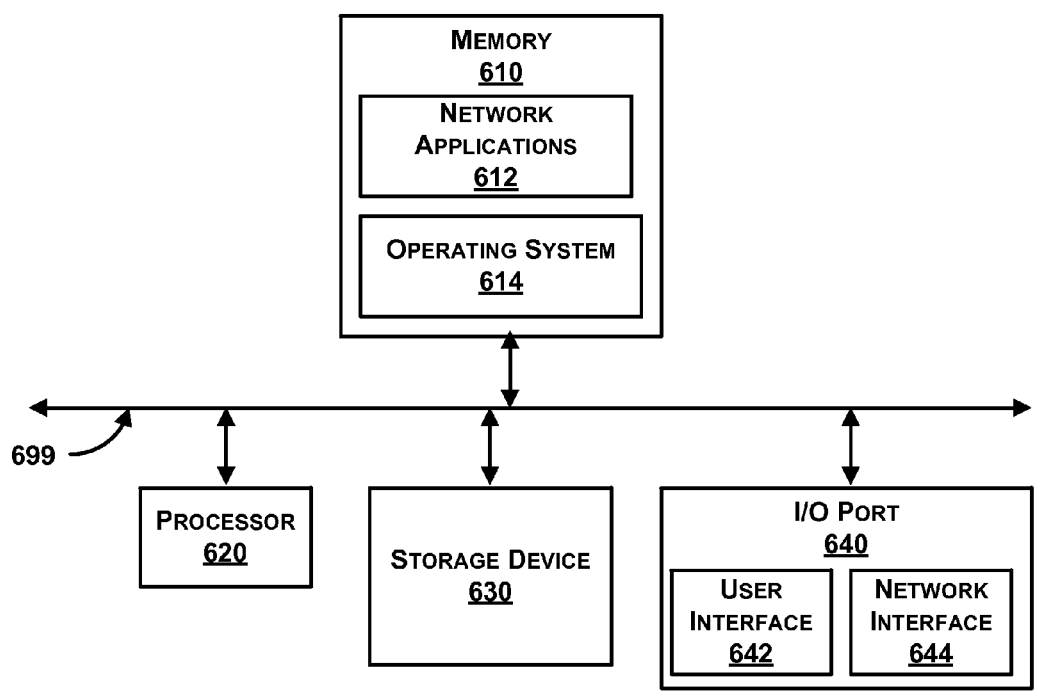
FIG. 6 is a block diagram illustrating an exemplary computing device, according to one embodiment.

Many of the functionalities described herein can be implemented with computer software, computer hardware, or a combination, as shown in FIG. 6.

The computing device 600 is an exemplary device that is implementable for each of the components of the system 100, including the wireless networking device 130. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog, and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 6, 8, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

The processor 620 can be a network processor (e.g., optimized for IEEE 802.11), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630

The storage drive 630 can be any non-volatile type of storage such as a magnetic disc, EEPROM, Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method for power saving in a Wi-Fi device of a wireless network utilizing Bluetooth, comprising the steps of:

sending a notification of deep sleep mode to an access point currently associated with a Wi-Fi radio;

transitioning the Wi-Fi radio to deep sleep mode from active mode while a Bluetooth radio remains active;

maintaining an active connection to the access point while in deep sleep mode, comprising transmitting at least one packet concerning the Wi-Fi radio connection to the access point using the Bluetooth radio;

receiving an indication, over the Bluetooth radio, of data packets addressed to the Wi-Fi radio;

responsive to the indication of data packets, transitioning the Wi-Fi radio from the deep sleep mode to the active mode; and sending a notification of active mode to the access point currently associated with the Wi-Fi radio.

2. The method of claim 1, wherein the Wi-Fi radio transitions to deep sleep mode responsive to at least one of: a number or rate of packets received, a duration of inactivity, a station entering sleep mode, a policy, or user input.

3. The method of claim 1, further wherein the Wi-Fi radio transitions to deep sleep mode responsive to receiving an acknowledgment from the access point of the deep sleep notification sent.

4. The method of claim 1, wherein maintaining the active connection comprises at least one of:
   maintaining active state information in a non-volatile internal data structure; and
   periodically transmitting a packet to the access point using the Bluetooth radio concerning the Wi-Fi radio connection, using active state information stored in the non-volatile internal data structure.

5. The method of claim 1, wherein maintaining the active connection comprises:
   temporarily waking up the Wi-Fi radio to periodically transmit a packet to the access point using the Wi-Fi radio concerning the Wi-Fi radio connection.

6. The method of claim 1, further comprising:
   responsive to transitioning to deep sleep mode, storing connection information concerning a connection to the access point;
   responsive to transitioning back to active mode, retrieving connection information concerning the access point from a memory, the connection information including a BSSID for the access point.

7. The method of claim 1, further comprising:
   identifying a request to turn on the Wi-Fi radio in a payload of a packet received by the Bluetooth radio, the packet having the access point as a source address and the Bluetooth radio as a destination address; and
   responsive to identifying the request, generating a command within an operating system of the device to turn on the Wi-Fi radio.

8. The method of claim 7, further comprising:
   retrieving connection information concerning the access point from a memory, the connection information including a BSSID for the access point; and
   sending packets from the Bluetooth radio, the packets using a MAC address of the Wi-Fi radio as the source address and the BSSID of the access point a destination address.

9. The method of claim 1, further comprising:
   registering the Bluetooth radio with the access point associated with the Wi-Fi radio.

10. A non-transitory computer-readable medium storing source code that, when executed, performs a method for power saving in a Wi-Fi device of a wireless network utilizing Bluetooth, the method comprising the steps of:
   sending a notification of deep sleep mode to an access point currently associated with a Wi-Fi radio;
   transitioning the Wi-Fi radio to deep sleep mode from active mode while a Bluetooth radio remains active;
   maintaining an active connection to the access point while in deep sleep mode, comprising transmitting at least one packet concerning the Wi-Fi radio connection to the access point using the Bluetooth radio;
   receiving an indication, over the Bluetooth radio, of data packets addressed to the Wi-Fi radio;
   responsive to the indication of data packets, transitioning the Wi-Fi radio from the deep sleep mode to the active mode; and
   sending a notification of active mode to the access point currently associated with the Wi-Fi radio.

11. The computer-readable medium of claim 10, wherein in the method, the Wi-Fi radio transitions to deep sleep mode responsive to at least one of: a number or rate of packets received, a duration of inactivity, a station entering sleep mode, a policy, or user input.

12. The computer-readable medium of claim 11, wherein in the method the Wi-Fi radio transitions to deep sleep mode responsive to receiving an acknowledgment from the access point of the deep sleep notification sent.

13. The computer-readable medium of claim 10, wherein in the method maintaining the active connection comprises at least one of:
   maintaining active state information in a non-volatile internal data structure; and
   periodically transmitting a packet to the access point using the Bluetooth radio concerning the Wi-Fi radio connection, using active state information stored in the non-volatile internal data structure.

14. The computer-readable medium of claim 10, wherein in the method maintaining the active connection comprises:
   temporarily waking up the Wi-Fi radio to periodically transmit a packet to the access point using the Wi-Fi radio concerning the Wi-Fi radio connection.

15. The computer-readable medium of claim 10, wherein the method further comprises:
   identifying a request to turn on the Wi-Fi radio in a payload of a packet received by the Bluetooth radio, the packet having the access point as a source address and the Bluetooth radio as a destination address; and
   responsive to identifying the request, generating a command within an operating system of the device to turn on the Wi-Fi radio.

16. The computer-readable medium of claim 15, wherein the method further comprises:
   retrieving connection information concerning the access point from a memory, the connection information including a BSSID for the access point; and
   sending packets from the Bluetooth radio, the packets using a MAC address of the Wi-Fi radio as the source address and the BSSID of the access point a destination address.

17. The computer-readable medium of claim 9, wherein the method further comprises:
   registering the Bluetooth radio with the access point associated with the Wi-Fi radio.

18. A Wi-Fi device in a wireless network to power save utilizing Bluetooth, the Wi-Fi device comprising:
   a processor; and
   a memory, comprising:
      a deep sleep controller to send a notification of deep sleep mode to an access point currently associated with a Wi-Fi radio,
      transition the Wi-Fi radio to deep sleep mode from active mode while a Bluetooth radio remains active,
      transmit at least one packet concerning the Wi-Fi radio connection to the access point using the Bluetooth radio,
      receive an indication, over the Bluetooth radio, of data packets addressed to the Wi-Fi radio,
      responsive to the indication of data packets, transition the Wi-Fi radio from the deep sleep mode to the active mode, and
      send a notification of active mode to the access point currently associated with the Wi-Fi radio.

* * * * *